Dec. 21, 1948.    M. GRAVES ET AL    2,457,039
SELF LOADING TRUCK

Filed Dec. 29, 1945    3 Sheets-Sheet 1

INVENTOR.
MICHAEL GRAVES
BY ANATOLY LANKOVSKI

Hazard & Miller
Attorneys

Dec. 21, 1948.    M. GRAVES ET AL    2,457,039
SELF LOADING TRUCK
Filed Dec. 29, 1945    3 Sheets-Sheet 2
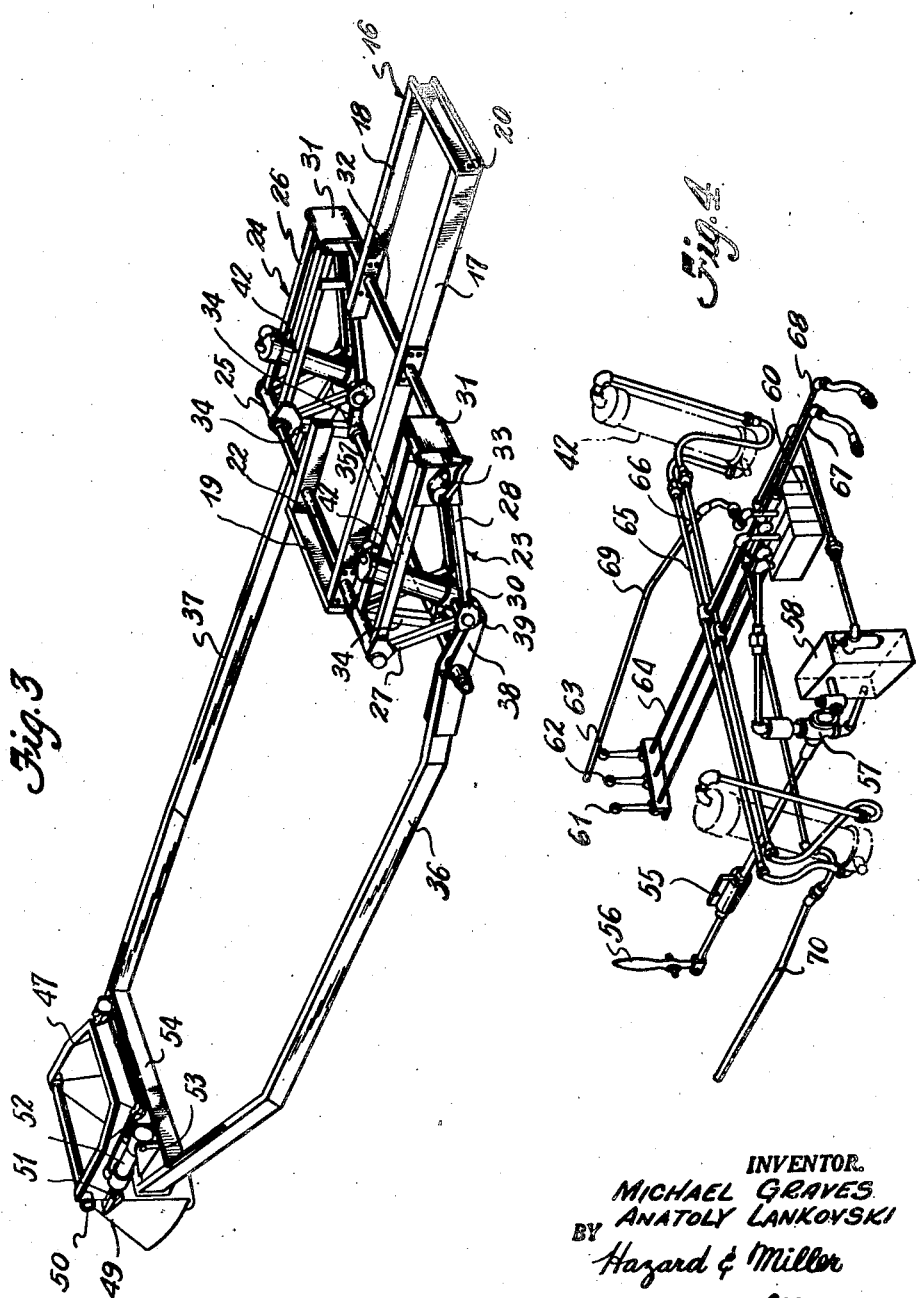
INVENTOR.
MICHAEL GRAVES
ANATOLY LANKOVSKI
BY
Hazard & Miller
Attorneys

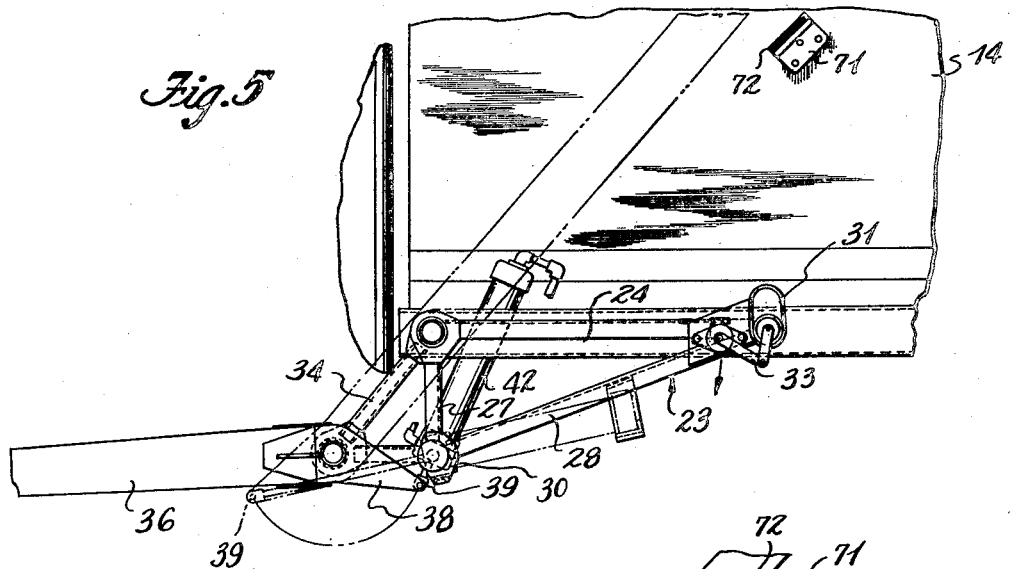
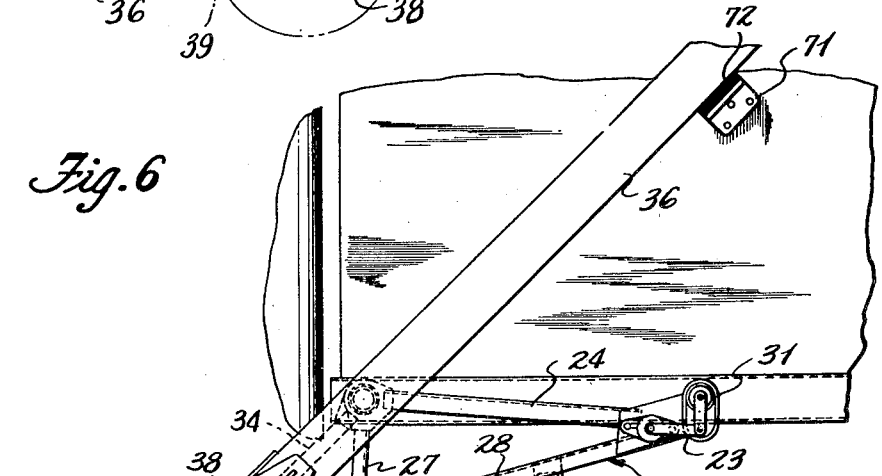
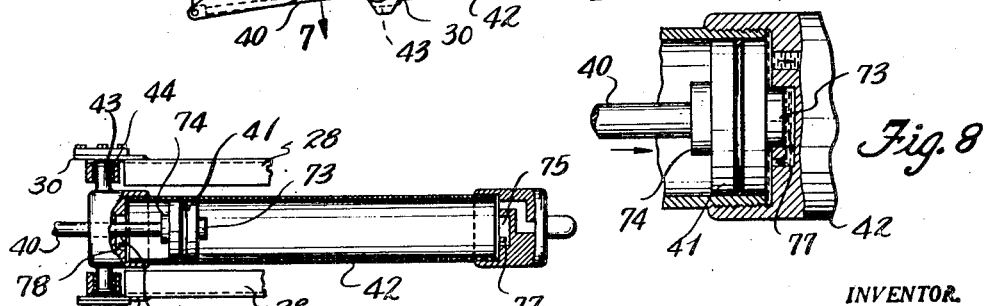

Patented Dec. 21, 1948

2,457,039

UNITED STATES PATENT OFFICE 2,457,039

SELF-LOADING TRUCK

Michael Graves and Anatoly Lankovski, Los Angeles, Calif., assignors to Matthew B. Butler, Los Angeles, Calif.

Application December 29, 1945, Serial No. 637,872

16 Claims. (Cl. 214—78)

This invention relates to improvements in self-loading trucks.

An object of the invention is to provide a construction applicable to a conventional type of dump truck wherein arms are pivotally supported adjacent the sides of the truck and carry a shovel or scoop adapted to be positioned by the arms in a loading position forwardly of the truck and to be swung upwardly over the cab into a dumping position for dumping the load picked up by the shovel into the body of the truck.

Heretofore, self-loading trucks of this general type have been designed but have generally proven unsatisfactory in that no adequate provision has been made for applying forces to the arms with sufficient mechanical advantage to cause the arms to elevate the load from the ground surface to dumping position.

An object of the present invention is to provide an improved self-loading truck wherein the arms are so mounted and pivotally supported and are so arranged with respect to fluid operated piston and cylinder constructions that when fluid pressure is supplied to the cylinders to cause their pistons to actuate the arms an adequate mechanical advantage is present to cause the mechanism to operate freely and easily.

Another object of the invention is to provide a self-loading mechanism for dump trucks and the like which is largely in the form of a self-contained unit adapted to be interposed between the chassis of the truck and the bed of the body so that it may be installed in a conventional type of dump truck without modifying or altering the frame of the truck chassis.

Still another object of the invention is to provide a self-loading mechanism for dump trucks and the like consisting of a frame adapted to be interposed between the chassis and the bed of the body having a beam extending thereacross on which cylinder frames are pivotally mounted and wherein cylinders are pivotally mounted on the cylinder frames and have pistons operatively connected to the arms of the self-loading mechanism with the arms supported on a torque tube suspended by the cylinder frames, thus enabling a convenient arrangement whereby adequate forces may be applied to effect an operation of the mechanism without involving the making of various parts of unusually heavy material to withstand the stresses to which they may be subjected.

Other objects of the invention are to provide a self-loading truck having the above-mentioned characteristics wherein provision is made for automatically dampening or retarding movements of the arms adjacent the ends of the strokes of the pistons within their respective cylinders and to snub and limit movements of the cylinder frames relative to the truck.

Still another object of the invention is to provide a self-loading truck in which a shovel or scoop is carried by a pair of swingable arms wherein the shovel or scoop has a lower jaw fixed to the arms and a cover or upper jaw pivotally connected thereto with means operable from the cab of the truck for forcibly opening or closing the upper jaw with respect to the lower jaw.

With the foregoing and other objects in view, which will be made manifest in the following detailed description and specifically pointed out in the appended claims, reference is made to the accompanying drawings for an illustrative embodiment of the invention, wherein:

Fig. 3 is a perspective view of the mechanical parts of the truck loading mechanism;

Fig. 4 is a perspective view of the hydraulic mechanism forming a part of the present invention;

Fig. 5 is a partial view in side elevation on an enlarged scale of one of the cylinder frames and illustrating a rear portion of one of the arms that is attached thereto showing in dotted lines the positions assumed by the parts when the arm approaches its extreme position for dumping the load from the shovel or scoop;

Fig. 6 is a view similar to Fig. 5, but illustrating the position assumed by the parts in its extreme position for dumping the load;

Fig. 7 is a diametrical section through one of the cylinders and may be regarded as having been taken substantially upon the line 7—7 upon Fig. 6; and Fig. 8 is a sectional view through the end of one of the cylinders illustrating the piston therein as approaching the end of one of its strokes.

Figure 1:
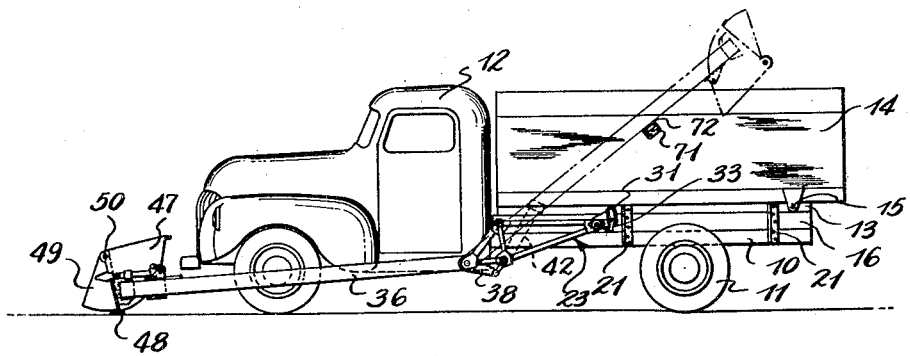
Figure 1 is a view in side elevation of a truck having applied thereto a self-loading mechanism embodying the present invention.
Figure 2:
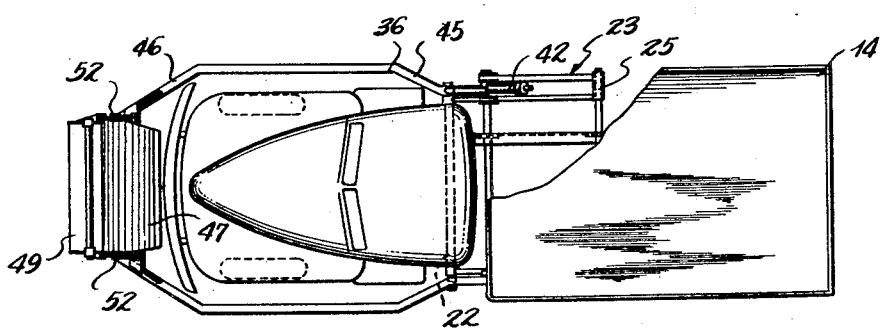
Fig. 2 is a top plan view of the same.

Referring to the accompanying drawings wherein similar reference characters designate similar parts throughout, 10 indicates the frame of a conventional type of dump truck supported on ground wheels 11 and having a driver's cab 12. Such dump trucks are usually equipped with a bed 13 on which the truck body 14 is pivotally mounted as at 15 so that the body may be elevated hydraulically to tilt the body with respect to its bed 13 to dump the contents.

In accordance with the present invention a rectangular frame 16 is provided composed of side members 17 and 18 connected by end members 19 and 20 and this frame is interposed between the chassis frame 10 and the body bed 13. Angle irons 21 or their equivalent may be bolted, riveted, or otherwise secured to the frame 10, the frame 16, and the body bed 13 to maintain these parts in superposed relationship. If angle irons are used for the purpose of securing the two frames and the body bed together the bolt or rivet holes for the bolts or rivets passing through the angle irons 21 are the only alternations or modifications that need be made in the frame 10. It is contemplated within the scope of this invention to use clamps or the equivalent to fasten these parts together to avoid forming holes in the frame 10 if such holes are undesirable or may weaken the frame.

A front beam 22 extends across the frame 16 and through the side members 17 and 18 adjacent their forward ends. This front beam is preferably tubular and has cylinder frames generally indicated at 23 and 24 pivotally supported thereon at its outer ends such as by sleeves 25. Each cylinder frame is generally in the form of two aligned triangular frames consisting of upper substantially horizontal struts 26, downwardly extending struts 27, and inclined struts 28. The struts 26 and 27 are welded or otherwise secured to the sleeves 25 so as to be rigidly secured thereto. The inclined struts 28 may be connected to the lower ends of the struts 27 such as by brackets 30. The rear ends of the struts 26 and the inclined struts 28 are rigidly secured to elongated collars or sleeves 31 through which extends the outer ends of a rear tubular beam 32 that extends through the side members 17 and 18 of the frame 16. The elongated transverse shape of the collars or sleeves 31 permits but limits movement of the cylinder frames about the forward beam 22 as a center and this movement is retarded or snubbed by snubbers 33 that are connected to the rear ends of the cylinder frames and the ends of the rear beam 32.

The cylinder frames also have hangers 34 and horizontal struts 34' rigidly secured thereto which suspend a transversely extending torque tube 35 which is rotatably mounted in the hangers. This torque tube is thus suspended in a position well below the frame 16 and in a position below the frame 10 of the chassis of the truck. The torque tube has arms 36 and 37 rigidly mounted thereon so that the arms which turn with the torque tube in the hangers 34 will be caused to move in unison from the full line position shown in Fig. 1 to the dotted line position shown therein. The arms 36 and 37 have rearwardly extending extensions 38 that are disposed between the parallel triangular frames that compose each cylinder frame. Wrist pins 39 are mounted in these extensions and are provided with pivotal connections between the extensions and piston rods 40 of pistons 41 that are reciprocable in cylinders 42. The cylinders 42 have trunnions 43 that pivotally support the cylinders at the bottoms of the cylinder frames such as by bearings 44 enabling the cylinders to pivot or tilt with respect to the cylinder frames from the position shown in Fig. 5 to the position shown in Fig. 6, in the course of actuating the arms 36 and 37 to elevate the load.

Forwardly of the torque tube 35 the arms 36 and 37 diverge sharply as illustrated at 45 so as to clear the ends of the forward beam 22 in swinging from the full line position shown in Fig. 1 to the dotted line position in Fig. 1, and to clear the sides of the cab, its runningboards, fenders, dump body, and other structure at the forward end of the truck. The forward ends of the arms converge in front of the truck as illustrated at 46 and have rigidly mounted thereon the lower or rearward jaw 47 of a shovel or scoop. This jaw or body of the scoop is preferably provided with a scraper blade 48 adapted to scrape the surface of the ground in loading the shovel or scoop. A cover or upper jaw 49 is pivotally connected as at 50 to the top of the lower or rearward jaw and this cover is pivotally connected as at 51 to piston rods reciprocable in cylinders 52 that are pivotally mounted as at 53 in brackets mounted on the connection 54 between the forward ends of the arms. By applying fluid pressure to the cylinders 52 the pistons therein may be actuated to open or swing forwardly the cover or forward jaw to enable a load to be scooped into the shovel or rearward jaw and when loaded the cover or forward jaw may then be forcibly closed to confine the scooped load therein.

55 indicates a power takeoff operable from any suitable part of the power plant of the truck and controllable by a lever 56 disposed in the cab of the truck. This power takeoff drives a pump 57 which receives liquid such as oil from a reservoir 58 and supplies it through a conduit 59 to a multiple-unit valve 60 the units of which are controllable by levers 61, 62, and 63 disposed in the cab of the truck and which operate the valves through cables or the equivalent indicated at 64. From one unit of this multiple-unit valve which is operable by the lever 61 fluid under pressure may be optionally conducted to and from either end of the operating cylinders 42 to actuate the pistons 41 therein in either direction. Conduits 65 and 66 portions of which are flexible connect the opposite ends of the cylinders 42 with this unit so that by supplying fluid pressure to either end of these cylinders and exhausting the opposite end the pistons therein may be forced in either direction to raise or lower the arms 36 and 37 as desired.

Another unit of the multiple-unit valve 60 which is controlled by lever 63 controls the flow of fluid through conduits 67 and 68 which lead to opposite ends of a cylinder or fluid pressure operated device, not shown, which controls the tilting of the truck body 14 about its pivots 15. Such construction is conventional and forms no part of the present invention and is used for discharging the load placed in the body by the improved self-loading device. A third unit of the multiple-unit valve 60 which is controlled by the lever 62 controls the flow of fluid through conduits 69 and 70 to and from the cylinders 52 on the scoop or shovel to actuate the cover or upper jaw thereof. In this manner the truck driver, by manipulation of the levers 56, 61, 62, and 63 in the driver's cab, may optionally cause the arms 36 and 37 to lift the scoop or shovel or to return to loading position; he may optionally open and close the scoop or shovel, and he may optionally tilt or restore the body 14 with relation to the body bed 13.

A feature of the invention resides in the arrangement between the cylinders 42 and the arms 36 and 37. As will be noted from an inspection of Fig. 5, when the arms 36 and 37 are in their substantially horizontal position wherein a load can be taken on the scoop or shovel the axes through the cylinders 42 are arranged at substantially right angles to a radius from the center of the torque tube 35 through the wrist pins 39. In this position wherein the load on the shovel must be lifted substantially vertically due to the approximate horizontal position of the cantilever arms 36 and 37 the force applied to the arms 36 and 37 is in a direction approximately at right angles to such radius so that a maximum mechanical advantage is available when required to lift the load in a substantially vertical direction. As the load is lifted and the arms swing upwardly about the torque tube 35 as an axis of rotation the cylinders 42 tilt about their trunnions 43 so that as the load in its movement changes from a vertical direction to a horizontal direction over the cab and is largely supported by the torque tube 35 the angle between the piston rods 40 and the radius through the wrist pins 39 continually decreases. In this position the piston rods 40 are effective on the arms 36 and 37 with less mechanical advantage but inasmuch as the load is largely supported by the torque tube and is moving in a direction more horizontal than vertical the loss of mechanical advantage is of no great importance. High mechanical advantage, however, is present when required to lift the load at the start of its upward movement due to the arrangement of the above-mentioned parts.

As the arms swing through vertical positions the weight of the load becomes effective to tilt the cylinder frames about the forward beam 22 in a clockwise direction as viewed in Fig. 5. Such tilting movement is permitted by the elongated shape of the collars or sleeves 31 and this permits the arms to swing through a somewhat greater arc than would be permissible if the cylinder frames were rigidly mounted on the frame 16. Thus, near the extreme end of movement of the arms 36 and 37 the load becomes effective to shift the cylinder frames from the position shown in Fig. 5 to the position shown in Fig. 6, and such shifting movement is dampened or retarded by the snubbers 33. On the sides of the truck there may be mounted rests 71 suitably faced with resilient material such as leather or rubber 72 on which the arms 36 and 37 may rest in their extreme load-discharging position.

Another feature of the invention resides in automatically dampening or retarding movements of the arms 36 and 37 near the ends of their strokes. To this end the pistons 41 have small auxiliary pistons 73 and 74 thereon which are receivable in auxiliary cylinders 75 and 76, respectively in the cylinder heads. As the fluid is being released from either end of the cylinder 42 and the piston 41 approaches the end of its stroke some fluid is entrapped in the auxiliary cylinder that the piston is approaching by the auxiliary piston 73 or 74 as the case may be. This fluid is expelled through a small orifice such orifices being indicated at 77 and 78. The expelling of the fluid through the small orifice retards the movement of the piston 41 near the end of its stroke automatically and decelerates the swinging movement of the arms 36 and 37.

From the above-described construction it will be appreciated that an improved self-loading truck is provided which is in the nature of a self-contained unit that may be installed on a conventional type of dump truck without seriously modifying or altering the chassis of the dump truck. The arrangement of the parts is such that a high mechanical advantage is available when required and by virtue of the swinging cylinder frames the arms may be caused to swing through an adequately long arc to dump the load from the shovel or scoop in such a manner as to completely fill the truck body 14. In operation, the truckdriver lowers the arms 36 and 37 and drives the truck forwardly to cause the shovel or scoop to pick up a load while the cover or upper jaw is in open position. When loaded the cover or upper jaw is forcibly closed to confine the load thereon and when the arms are swung upwardly over the cab the load is confined in the shovel until the shovel has reached a position so that the load may spill out of the back of the shovel between the arms. The ability to close the shovel prevents part of the load from dropping onto the hood or cap of the truck. When the truck has been loaded the load may be carried to the desired location and dumped. The operations of the arms, shovel, and the tilting of the truck body are selectively controllable by the truckdriver from the cab.

Various changes may be made in the details of construction without departing from the spirit and scope of the invention as defined by the appended claims.

We claim:

1. A truck having frames pivotally mounted upon the sides thereof, arms pivotally mounted upon said frames, a scoop or shovel mounted upon the arms adapted to be positioned thereby forwardly of the truck or swung upwardly over the truck to dump into its body, fluid pressure operated means mounted upon said frames and operatively connected to the arms to swing the arms, and means for supplying said fluid pressure operated means with fluid pressure.

2. A truck having frames pivotally mounted upon the sides thereof, arms pivotally mounted entirely upon said frames, a scoop or shovel mounted upon the arms adapted to be positioned thereby forwardly of the truck or swung upwardly over the truck to dump into its body, fluid pressure operated means mounted upon said frames and operatively connected to the arms to swing the arms, means for supplying said fluid pressure operated means with fluid pressure, and means for limiting pivotal movements of said frames relatively to the truck.

3. A truck having frames pivotally mounted upon the sides thereof, arms pivotally mounted upon said frames, a scoop or shovel mounted upon the arms adapted to be positioned thereby forwardly of the truck or swung upwardly over the truck to dump into its body, fluid pressure operated means mounted upon said frames and operatively connected to the arms to swing the arms, means for supplying said fluid pressure operated means with fluid pressure, and means for snubbing pivotal movements of said frames relatively to the truck.

4. A truck having frames pivotally mounted upon the sides thereof, arms pivotally mounted upon said frames, a scoop or shovel mounted upon the arms adapted to be positioned thereby forwardly of the truck or swung upwardly over the truck to dump into its body, cylinders pivotally mounted upon said frames having pistons therein pivotally connected to said arms, means for supplying the cylinders with fluid pressure, and means for limiting and snubbing relative movements of said frames relatively to the truck.

5. In a self-loading truck, arms pivotally mounted adjacent the sides of the truck, a scoop or shovel carried by the arms adapted to be positioned thereby forwardly of the truck or swung upwardly over the truck to dump therein, piston and cylinder means for swinging said arms, means for supplying said piston and cylinder means with fluid under pressure, and means for automatically retarding relative movements between the piston and cylinder means only adjacent the ends of their strokes relative to each other.

6. In a self-loading truck, arms pivotally mounted adjacent the sides of the truck, a scoop or shovel carried by the arms adapted to be positioned thereby forwardly of the truck or swung upwardly over the truck to dump therein, piston and cylinder means for swinging said arms, means for supplying said piston and cylinder with fluid under pressure, and means for automatically retarding relative movements between the piston and cylinder means only adjacent the ends of their strokes relative to each other, comprising means for entrapping a portion of the fluid between the piston and the end of the cylinder and causing the same to be expelled through a small orifice.

7. A truck having arms pivotally mounted thereon adjacent its sides, a shovel or scoop carried by the arms adapted to be positioned thereby forwardly of the truck, or swung upwardly over the truck into dumping position, cylinders pivotally mounted upon the sides of the truck, pistons reciprocable in the cylinders operatively connected to the arms at points thereof opposite the shovel or scoop with respect to the pivotal connections of the arms, means for supplying the cylinders with fluid pressure, the arrangement of the arms, pistons, and cylinders being such that when the pistons are actuated they will apply force to the arms at approximately right angles to a radius from the axis of rotation of the arms in starting the lift from the forwardmost position and thereafter apply forces in a continuously decreasing angle to said radius as the arms are swung upwardly into dumping position.

8. A truck having a chassis, a body and a bed for the body, a separate integral frame interposed between the chassis and the bed for the body, arms pivotally supported upon said frame, and fluid pressure operated means mounted upon said frame for swinging said arms, said arms carrying a shovel or scoop adapted to be carried thereby upwardly over the truck.

9. A truck having a frame interposed between its chassis and the bed for its body, a beam extending across said frame, cylinder frames pivotally mounted upon said beam, a torque tube suspended from said cylinder frames, arms mounted on the torque tube, a shovel carried by said arms, cylinders pivotally mounted upon the cylinder frames, pistons reciprocable in the cylinders and pivotally connected to said arms, and means for supplying said cylinders with fluid under pressure.

10. A truck having a frame interposed between its chassis and the bed for its body, a beam extending across said frame, cylinder frames pivotally mounted upon said beam, a torque tube suspended from said cylinder frames, arms mounted on the torque tube, a shovel carried by said arms, cylinders pivotally mounted upon the cylinder frames, pistons reciprocable in the cylinders and pivotally connected to said arms, means for supplying said cylinders with fluid under pressure, and means on said frame for limiting and snubbing pivotal movements of the cylinder frames with respect to said frame.

11. A truck having arms at the sides thereof, a scoop or shovel mounted on the outer ends of the arms, a torque tube connecting the inner ends of the arms about the axis of which the arms may swing, cranks on the arms, a cylinder for each arm, pistons reciprocable therein having piston rods projecting therefrom pivotally connected to the cranks on the arms, means for supplying fluid under pressure to the cylinders to actuate the pistons, and means pivotally mounting the cylinders on the truck for swinging movement about axes adjacent those ends of the cylinders from which the piston rods extend.

12. A truck having arms at the sides thereof, a scoop or shovel mounted on the outer ends of the arms, means pivotally supporting the inner ends of the arms on the truck for swinging movement relative thereto, cranks on the arms, a cylinder for each arm, pistons reciprocable in the cylinders having piston rods projecting from the ends thereof and pivotally connected to their respective cranks, means for supplying the cylinders with a fluid under pressure to actuate the pistons therein, and means for pivotally mounting the cylinders on the sides of the truck for swinging movement about axes adjacent those ends of the cylinders from which the piston rods project.

13. A truck having a pair of arms, a scoop or shovel mounted on the outer ends of the arms, frames pivotally mounted upon the sides of the truck, the inner ends of the arms being pivotally mounted upon said frames at points spaced from the axes of rotation of the frames, cranks on the arms, a cylinder for each arm pivotally mounted upon its respective frame, each cylinder having a piston therein and a piston rod projecting therefrom pivotally connected to the crank of its respective arm, means for supplying a fluid under pressure to the cylinders to actuate the pistons therein, and means for limiting swinging movement of the frames relatively to the truck.

14. A truck having a pair of arms, a scoop or shovel mounted on the outer ends of the arms, frames pivotally mounted upon the sides of the truck, the inner ends of the arms being pivotally mounted upon said frames at points spaced from the axes of rotation of the frames, cranks on the arms, a cylinder for each arm pivotally mounted upon its respective frame, each cylinder having a piston therein and a piston rod projecting therefrom pivotally connected to the crank of its respective arm, means for supplying a fluid under pressure to the cylinders to actuate the pistons therein, and means for snubbing and limiting swinging movement of the frames relatively to the truck.

15. A truck having a pair of arms, a scoop or shovel mounted on the outer ends of the arms, frames pivotally mounted upon the sides of the truck, the inner ends of the arms being pivotally mounted upon said frames at points spaced from the axes of rotation of the frames, cranks on the arms, a cylinder for each arm pivotally mounted upon its respective frame, each cylinder having a piston therein and a piston rod projecting therefrom pivotally connected to the crank of its respective arm, means for supplying a fluid under pressure to the cylinders to actuate the pistons therein, said cylinders being pivotally mounted upon said frames for swinging movement about axes adjacent the ends through which the piston rods extend, and means for limiting swinging movement of the frames relatively to the truck.

16. A truck having arms at the sides thereof, a scoop or shovel mounted on the outer ends of the arms, frames pivotally mounted at the sides of the truck, said arms being pivotally mounted at their inner ends on the frames at points disposed downwardly and forwardly of the points of pivotal mounting of the frames on the truck, cranks extending rearwardly from the arms, a cylinder for each arm, a piston reciprocable in each cylinder having a piston rod extending from one end thereof and pivotally connected to its respective crank, means for supplying the cylinders with a fluid under pressure to actuate the pistons therein, means pivotally mounting that end of the cylinder from which the piston rod extends on its frame at a point below the point of pivotal mounting of the frame upon the truck, and means for snubbing and limiting the swinging movement of the frames relatively to the truck.

MICHAEL GRAVES.
ANATOLY LANKOVSKI.

REFERENCES CITED

The following references are of record in the file of this patent:

UNITED STATES PATENTS

| Number | Name | Date |
|---|---|---|
| 1,239,554 | Armstrong et al. | Sept. 11, 1917 |
| 1,320,970 | Beaty | Nov. 4, 1919 |
| 1,962,459 | Ostlund | June 12, 1934 |
| 2,170,932 | Venema | Aug. 29, 1939 |
| 2,220,815 | Feilcke | Nov. 5, 1940 |
| 2,234,599 | Johnston | Mar. 11, 1941 |
| 2,244,894 | Parker | June 10, 1941 |
| 2,286,723 | Frost | June 16, 1942 |
| 2,290,738 | Chadwick, Jr. | July 21, 1942 |
| 2,296,085 | Boldt | Sept. 15, 1942 |
| 2,326,338 | Drott et al. | Aug. 10, 1943 |
| 2,353,655 | Day | July 18, 1944 |
| 2,362,994 | Frost | Nov. 21, 1944 |
| 2,386,216 | Hay | Oct. 9, 1945 |
| 2,391,813 | Wood | Dec. 25, 1945 |